US009985833B2

(12) United States Patent
Inaba et al.

(10) Patent No.: US 9,985,833 B2
(45) Date of Patent: May 29, 2018

(54) METHOD AND APPARATUS FOR SOFTWARE DETECTION

(71) Applicant: FUJITSU LIMITED, Kawasaki-shi, Kanagawa (JP)

(72) Inventors: Tatsushige Inaba, Osaka (JP); Jun Sugii, Kobe (JP); Hideo Nishi, Miki (JP); Kiyotaka Iwamoto, Toyonaka (JP)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 14/977,727

(22) Filed: Dec. 22, 2015

(65) Prior Publication Data

US 2016/0197814 A1 Jul. 7, 2016

(30) Foreign Application Priority Data

Jan. 6, 2015 (JP) .................................. 2015-000772

(51) Int. Cl.
*H04L 12/24* (2006.01)
*G06F 11/30* (2006.01)

(52) U.S. Cl.
CPC .......... *H04L 41/0853* (2013.01); *G06F 11/30* (2013.01); *G06F 11/3051* (2013.01); *G06F 11/302* (2013.01); *G06F 11/3017* (2013.01)

(58) Field of Classification Search
CPC .. H04L 41/0853; G06F 11/30; G06F 11/3017; G06F 11/302; G06F 11/3051
USPC ........................................................ 709/224
See application file for complete search history.

(56) References Cited

U.S. PATENT DOCUMENTS

| 2004/0103190 | A1* | 5/2004 | Mochizuki | .......... | H04L 41/0253 709/224 |
| 2010/0125657 | A1* | 5/2010 | Dowling | ............ | G06F 11/3051 709/224 |
| 2012/0246645 | A1* | 9/2012 | Iikura | ...................... | G06F 8/61 718/1 |
| 2014/0053145 | A1* | 2/2014 | Steigleder | ................ | G06F 8/65 717/169 |
| 2014/0379981 | A1* | 12/2014 | Krishna | .................. | H04L 67/16 711/114 |

FOREIGN PATENT DOCUMENTS

| JP | 2004-5413 | 1/2004 |
| JP | 2012-203640 | 10/2012 |

\* cited by examiner

*Primary Examiner* — Moustafa M Meky
*Assistant Examiner* — Elizabeth Kassa
(74) *Attorney, Agent, or Firm* — Fujitsu Patent Center

(57) ABSTRACT

An information processing apparatus detects the presence of specific software on the information processing apparatus utilizing a first detection condition, in which the specific software was judged to be installed on the information processing apparatus in prior detection utilizing the first detection condition, and the first detection condition is generated by any one of a plurality of generating rules on detection conditions for software. If this detection utilizing the first detection condition fails, the information processing apparatus detects the specific software utilizing a second detection condition that is one of a plurality of detection conditions generated by the plurality of generating rules and is different from the first detection condition.

6 Claims, 16 Drawing Sheets

FIG. 6

121a CONDITION DEFINITION MANAGEMENT TABLE

| DEFINI-TION ID | DETECTION REQUIRE-MENT | ENVIRON-MENT | WHEN | FROM WHERE | HOW | ANALYSIS METHOD | USE INFORMA-TION | HOW TO OBTAIN USE INFORMATION |
|---|---|---|---|---|---|---|---|---|
| | | | | | | INFORMATION ACQUISITION ELEMENTS | | |
| D00001 | NAME | OS_A (ver.7 OR EARLIER) | INVENTORY COLLECTION TIME | REGISTRY | API | API RETURN VALUE (CHARACTER STRING) | NONE | NONE |
| D00002 | NAME | OS_A (ver.7 OR EARLIER) | INVENTORY COLLECTION TIME | ACTUAL FILE PROPERTY | API | API RETURN VALUE (CHARACTER STRING) | EXECUTION FILE NAME | NONE |
| D00003 | VERSION | OS_A (ver.7 OR EARLIER) | INVENTORY COLLECTION TIME | REGISTRY | API | API RETURN VALUE (CHARACTER STRING) | NONE | NONE |
| ... | ... | ... | ... | ... | ... | ... | ... | ... |
| D00101 | NAME | OS_A (ver.8 OR LATER) | INVENTORY COLLECTION TIME | REGISTRY | PowerShell | RETURN VALUE (TEXT:Name) | USER ID | FROM LOGON USER NAME |
| D00102 | VERSION | OS_A (ver.8 OR LATER) | INVENTORY COLLECTION TIME | ACTUAL FILE PROPERTY | PowerShell | RETURN VALUE (TEXT:Name) | USER ID | FROM LOGON USER NAME |
| ... | ... | ... | ... | ... | ... | ... | ... | ... |
| D00201 | NAME | OS_B | INVENTORY COLLECTION TIME | NONE | API | RETURN VALUE (PackageInfo) | PACKAGE NAME | FROM PACKAGE NAME |
| D00202 | VERSION | OS_B | INVENTORY COLLECTION TIME | NONE | API | RETURN VALUE (PackageInfo) | PACKAGE NAME | FROM PACKAGE NAME |
| ... | ... | ... | ... | ... | ... | ... | ... | ... |
| D00901 | NAME | ANY ENVIRONMENT | INVENTORY COLLECTION TIME | NETWORK | WebAPI | API RETURN VALUE (HTML TAG NAME: aaa) | PACKAGE NAME | FROM PACKAGE NAME |
| D00902 | NAME | ANY ENVIRONMENT | INVENTORY COLLECTION TIME | NETWORK | WebAPI | API RETURN VALUE (JSON ELEMENT NAME: bbb) | PACKAGE NAME | FROM PACKAGE NAME |
| ... | ... | ... | ... | ... | ... | ... | ... | ... |

121b CANDIDATE SETTING VALUE MANAGEMENT TABLE

| VALUE ID | DEFINITION ID | CATEGORY | VALUE |
|---|---|---|---|
| V00001 | D00001 | FROM WHERE | HKLM¥SOFTWARE¥VendorA¥ProductA¥... KeyAAA |
| V00002 | D00001 | FROM WHERE | HKLM¥SOFTWARE¥VendorA¥ProductB¥... KeyBBB |
| V00003 | D00001 | HOW | READ FROM REGISTRY WITH API |
| V00004 | D00001 | HOW | READ FROM INI FILE WITH API |
| V00005 | D00001 | ANALYSIS METHOD | $5^{th}$ ARGUMENT FOR RegQueryValueEX() |
| V00006 | D00001 | ANALYSIS METHOD | $5^{th}$ ARGUMENT FOR GetPrivateProfileString() |
| V00007 | D00001 | USE INFORMATION | USER ID |
| V00008 | D00001 | USE INFORMATION | VALUE NAME |
| V00009 | D00001 | HOW TO OBTAIN USE INFORMATION | OBTAIN LOGON USER NAME WITH API |
| ⋮ | ⋮ | ⋮ | ⋮ |

FIG. 7

121c ARRANGEMENT MANAGEMENT TABLE

| ARRANGEMENT ID | DEFINITION ID |
|---|---|
| C0001 | D00001 |
| C0001 | D00003 |
| C0001 | D00005 |
| ⋮ | ⋮ |
| C0002 | D00031 |
| C0002 | D00032 |
| C0002 | D00033 |
| ⋮ | ⋮ |
| C0003 | D00101 |
| C0003 | D00102 |
| C0003 | D00103 |
| ⋮ | ⋮ |
| C0077 | D00201 |
| C0077 | D00202 |
| C0077 | D00203 |
| ⋮ | ⋮ |
| C0100 | D00901 |
| C0100 | D00902 |
| ⋮ | ⋮ |

- C0001 group: OS_A(Ver.7) DESKTOP APPLICATION
- C0002 group: OS_A(Ver.8) DESKTOP APPLICATION
- C0003 group: OS_A NON DESKTOP APPLICATION
- C0077 group: OS_B APPLICATION

FIG. 8

TARGET SOFTWARE
MANAGEMENT TABLE

122a

| CONDITION ID | NAME | VERSION |
|---|---|---|
| @0001 | SOFTWARE A | 1.2.3.4 |
| @0002 | SOFTWARE B | 6.5-9876 |
| @0003 | SOFTWARE C | 0.9.8e |
| @0004 | SOFTWARE D | build777 |
| ⋮ | ⋮ | ⋮ |

FIG. 10

122b DETECTION CONDITION MANAGEMENT TABLE

| CONDI-TION ID | ARRANGE-MENT ID | DEFINITION ID | FROM WHERE | HOW | ANALYSIS METHOD | USE INFORMA-TION | HOW TO OBTAIN USE INFORMATION |
|---|---|---|---|---|---|---|---|
| @0001 | C0001 | D00001 | HKLM¥SOFTWARE¥VendorA¥ProductA¥...KeyAAA | READ FROM REGISTRY WITH API | 5th ARGUMENT FOR RegQueryValueEx() | VALUE NAME: aaa | NONE |
| @0001 | C0001 | D00003 | HKLM¥SOFTWARE¥VendorA¥ProductA¥...KeyAAA | READ FROM REGISTRY WITH API | 5th ARGUMENT FOR RegQueryValueEx() | VALUE NAME: bbb | NONE |
| ... | ... | ... | ... | ... | ... | ... | ... |
| @0002 | C0001 | D00002 | PowerShell | Get-AppxPackage | TEXT: Version | USER ID | GetUserName() |
| @0002 | C0001 | D00002 | PowerShell | Get-AppxPackage | TEXT: Name | USER ID | GetUserName() |
| ... | ... | ... | ... | ... | ... | ... | ... |

FIG. 11

METHOD AND APPARATUS FOR SOFTWARE DETECTION

CROSS-REFERENCE TO RELATED APPLICATION

This application is based upon and claims the benefit of priority of the prior Japanese Patent Application No. 2015-000772, filed on Jan. 6, 2015, the entire contents of which are incorporated herein by reference.

FIELD

The embodiments discussed herein relate to a method and apparatus for software detection.

BACKGROUND

In a computer network that interconnects a number of devices, a management server collects inventory data from these devices. Inventory data indicates a list of software and other resources installed on an individual device, such as a terminal device, in a network. To collect such inventory data from a terminal device, the management server makes a request for inventory collection to the terminal device, for example. In response to the request, the terminal device detects what software is locally installed, for example, and then sends the detection result as inventory data to the management server. Such collected inventory data is used to monitor the current state for license management and security maintenance.

One example of techniques for managing devices over a network is to provide a user support server for providing proper troubleshooting and support promptly in the events of failures and setups of computers, installation of applications, and others. This user support server generates support information about user computers on the basis of configuration information of software and others of individual user computers and information about user inquiries.

Virtual machines may be under management. One example of techniques for managing virtual machines is to compare one or more files used for operating each virtual machine with one or more template files, and generate configuration information of the virtual machine on the basis of the comparison result.

Please see, for example, Japanese Laid-open Patent Publication Nos. 2004-005413 and 2012-203640.

Software is detected under detection conditions that are prepared in advance. For example, software that satisfies such detection conditions is judged to be installed. The detection conditions are manually set by a resource management vendor or administrators of the user system, for example. The detection conditions indicate criteria for detecting the presence of software on the basis of whether specific files exist or not, values of predetermined environment setting, or others.

Using detection conditions enables to detect the presence of software at high speed and low load, because what needs to be done is only to determine whether the detection conditions are satisfied or not. However, since the detection conditions are fixed, they do not follow software upgrades or changes in the operating environment of software, and therefore software may not be detected by the same software conditions as previously used. As a result, it is difficult to monitor the state of software installation accurately.

SUMMARY

According to one aspect, there is provided a non-transitory computer-readable storage medium storing therein a software detection program that causes a computer to execute a process including: detecting a presence of a specific software on the computer utilizing a first detection condition, the specific software being judged to be installed on the computer by prior detection utilizing the first detection condition, the first detection condition being generated by one of a plurality of detection condition generating rules for the specific software; and detecting the specific software utilizing a second detection condition when the specific software is not detected by the first detection condition, the second detection condition being one of a plurality of detection conditions generated by the plurality of detection condition generating rules and being different from the first detection condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a condition definition management table;

FIG. 7 illustrates an example of a candidate setting value management table;

FIG. 8 illustrates an example of an arrangement management table;

FIG. 10 illustrates an example of a target software management table;

FIG. 11 illustrates an example of a detection condition management table;

DESCRIPTION OF EMBODIMENTS

Figure 1:
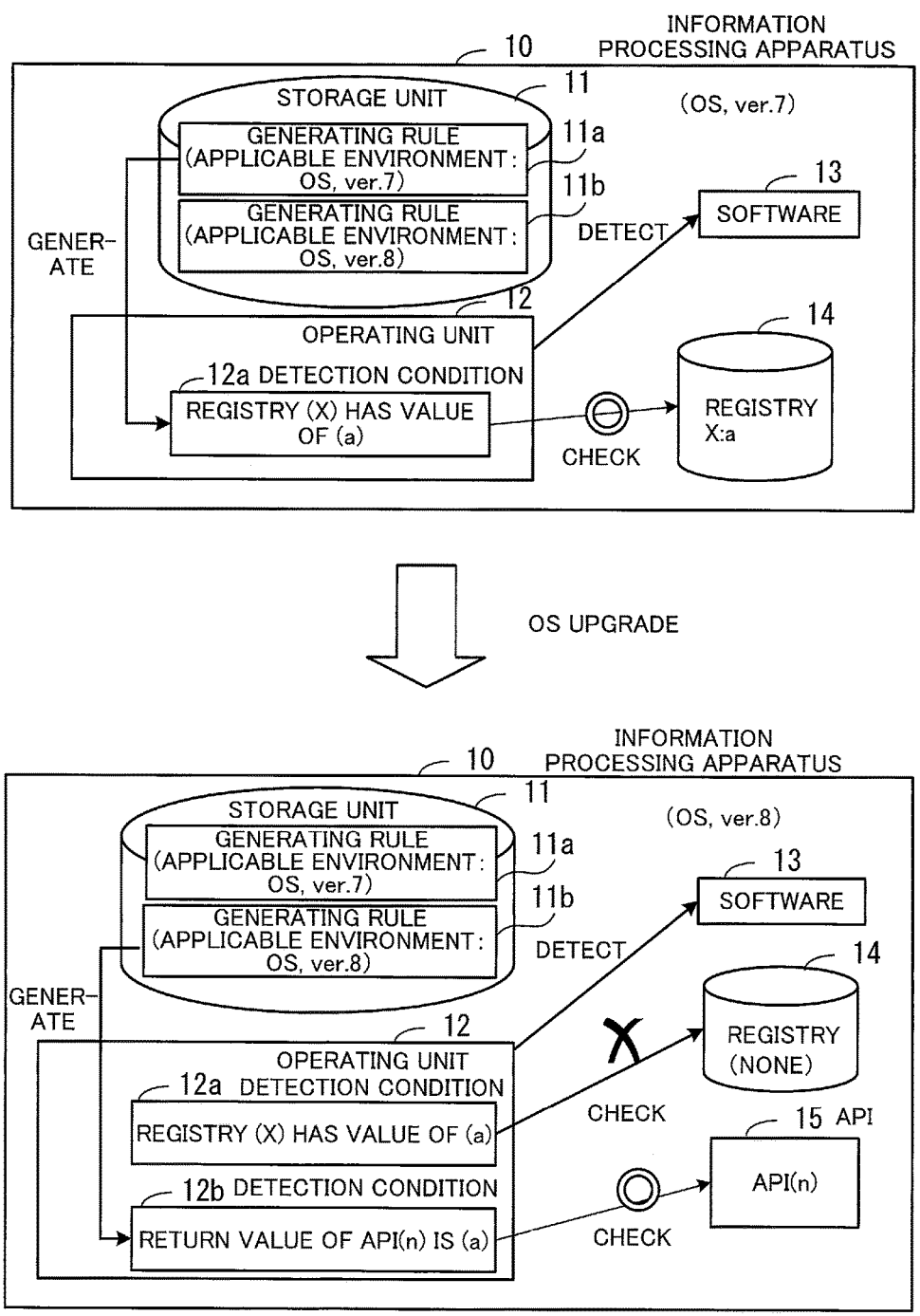
FIG. 1 illustrates an example of an information processing apparatus according to a first embodiment.

Several embodiments will be described below with reference to the accompanying drawings, wherein like reference numerals refer to like elements throughout. Features of the embodiments may be combined unless they exclude each other.

First Embodiment

FIG. 1 illustrates an example of an information processing apparatus according to a first embodiment. An information processing apparatus (computer) 10 includes a storage unit 11 and an operating unit 12. Software 13 is installable on the information processing apparatus 10, and for example, includes executable files and data used to execute programs described in the files. At the time of the installation of the software 13, the operating environment for the software 13 is set up on the information processing apparatus 10. For example, this setup involves storing setting values for the software 13 in a registry 14 of the information processing apparatus 10. The registry 14 is a database for recording software setting values.

The information processing apparatus 10 is provided with a function of detecting the presence of the software 13 (i.e., detecting whether the software 13 is installed). The information processing apparatus 10 having such a function may be called a software detection apparatus. For example, when receiving, from an external server, a request for inventory collection, the information processing apparatus 10 detects the presence of the software 13, and then sends a detection result to the server.

The storage unit 11 stores a plurality of detection condition generating rules 11a and 11b on detection conditions for software. The detection conditions are used for detecting the presence of the software 13. A plurality of detection conditions 12a and 12b are respectively generated by the plurality of generating rules 11a and 11b. It is now assumed that the software 13 was judged to be installed on the information processing apparatus 10 by prior detection utilizing the detection condition 12a generated by the generating rule 11a.

When detecting the presence of the software 13 on the information processing apparatus 10, the operating unit 12 of the information processing apparatus 10 uses the same detection condition 12a as used in the prior detection. The software 13 is judged to be installed if the detection condition 12a is satisfied. The operating unit 12 fails to detect the software 13 if the detection condition 12a is not satisfied.

If the detection utilizing the detection condition 12a fails, then the operating unit 12 detects the software 13 utilizing a detection condition 12b that is one of the plurality of detection conditions 12a and 12b generated by the plurality of generating rules 11a and 11b and is different from the detection condition 12a. For example, the operating unit 12 uses the detection condition 12b generated by the generating rule 11b. Alternatively, the operating unit 12 may use another detection condition for the detection. The other detection condition may be generated by modifying values included in the detection condition 12a such that they still follow the generating rule 11a, from which the detection condition 12a is generated. The software 13 is judged to be installed if any of these detection conditions is satisfied.

If the operating unit 12 fails to detect the presence of the software 13 utilizing any of the detection conditions generated by the plurality of generating rules 11a and 11b, then the operating unit 12 judges that the software 13 is already deleted (uninstalled) from the information processing apparatus 10.

In this connection, the plurality of generating rules 11a and 11b may be stored in association with their applicable software operating environments in the storage unit 11. In this case, if the operating unit 12 fails to detect the presence of the software 13 utilizing the detection condition 12a, it performs the detection again utilizing the detection condition 12b generated by a generating rule corresponding to the operating environment of this detection time. Referring to the example of FIG. 1, the generating rule 11a is applicable to Operating System (OS) version 7, whereas the generating rule 11b is applicable to OS version 8.

It is assumed that a setting item "X" with a value of "a" is set in the registry 14 when the software 13 is installed on the OS version 7. The detection condition 12a generated by the generating rule 11a applicable to the OS version 7 may specify that the setting item "X" with a value of "a" in the registry 14 proves that the software 13 has been installed. Therefore, in detecting the presence of the software 13 utilizing the detection condition 12a, a value satisfying this condition is obtained from the registry 14 and it is judged that the software 13 is installed.

It is assumed that the OS is now upgraded. In this OS upgrading, the setting value for the software 13 is deleted from the registry 14, and a method of obtaining the setting value is changed to one of obtaining it as an argument for Application Programming Interface (API) 15.

When the presence of the software 13 is detected after the OS upgrading, it is first determined whether the detection condition 12a used previously is satisfied or not. Referring to the example of FIG. 1, the detection condition 12a is not satisfied because the value is already deleted from the registry 14. Then, the detection condition 12b is generated by the generating rule 11b that is applicable to the upgraded OS. The detection condition 12b specifies that the return value of "a" from the API(n) proves that the software 13 is installed. When the presence of the software 13 is detected by the detection condition 12b, a return value of "a" from the API(n) is obtained. Therefore, it is possible to accurately judge that the software 13 is installed.

As described above, the first embodiment makes it possible to detect the presence of the software 13 accurately even after the operating environment for the software 13 is changed, thereby improving the accuracy of detection of the software 13.

In the case of a failure in detecting the software 13 utilizing any of the detection conditions generated by the plurality of generating rules 11a and 11b, the software 13 is judged to be already uninstalled. Therefore, it is possible to accurately judge that the software 13 is already uninstalled.

In this connection, for example, the operating unit 12 may be implemented by using a processor provided in the information processing apparatus 10, and the storage unit 11 may be implemented by using a memory provided in the information processing apparatus 10.

Second Embodiment

A second embodiment will now be described. The second embodiment is designed such that a management server sends a plurality of terminal devices detection condition generation information indicating a plurality of detection condition generating rules on detection conditions for software, and each terminal device automatically generates detection conditions from the detection condition generation information. Each terminal device then sends, among the generated detection conditions, detection conditions that have actually led to the detection of software, to the management server. The management server manages the received detection conditions.

Figure 2:
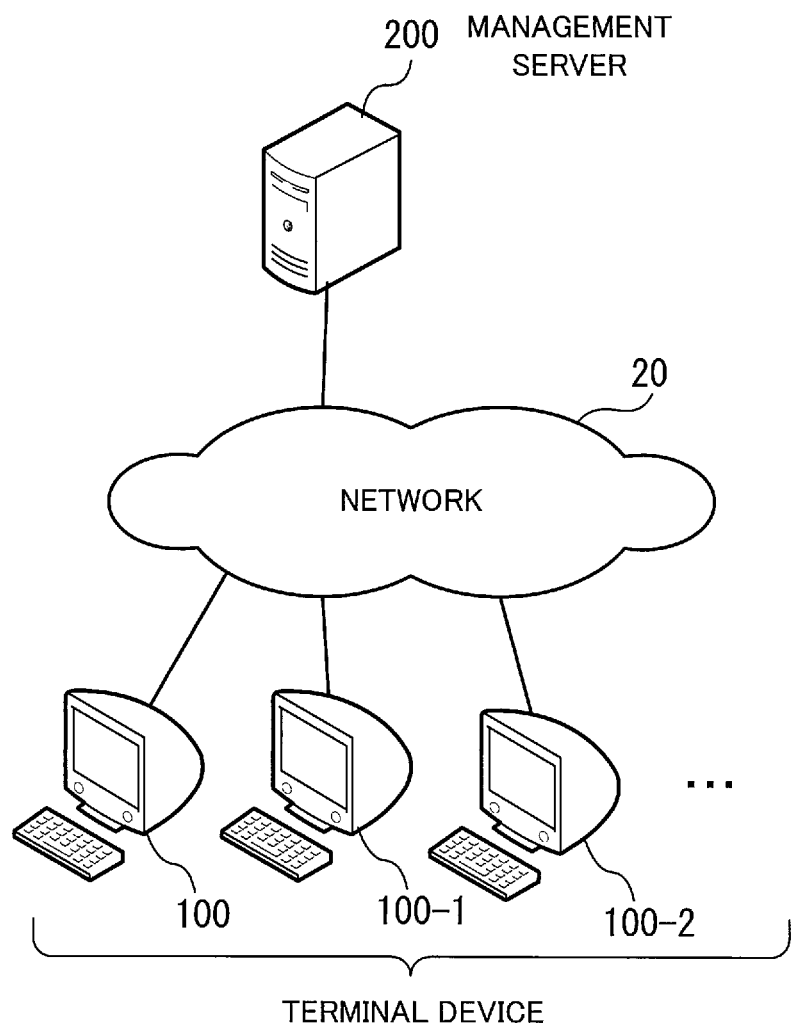
FIG. 2 illustrates an example of a system configuration according to a second embodiment.

FIG. 2 illustrates an example of a system configuration according to the second embodiment. The management server 200 is connected to a plurality of terminal devices 100, 100-1, 100-2, . . . over a network 20. The management server 200 collects inventory data from the plurality of terminal devices 100, 100-1, 100-2, . . . , and manages their states of software installation. The plurality of terminal devices 100, 100-1, 100-2, . . . detect their locally installed software utilizing detection conditions. If the plurality of terminal devices 100, 100-1, 100-2, . . . fail to detect software previously detected, utilizing the current detection conditions, the plurality of terminal devices 100, 100-1, 100-2, . . . generate new detection conditions from detection condition generation information. The plurality of terminal devices 100, 100-1, 100-2, . . . then make attempts to detect software utilizing the generated detection conditions. Such automatic generation of detection conditions makes it possible to detect software even if the software is upgraded or if the execution platform for the software is changed.

Figure 3:
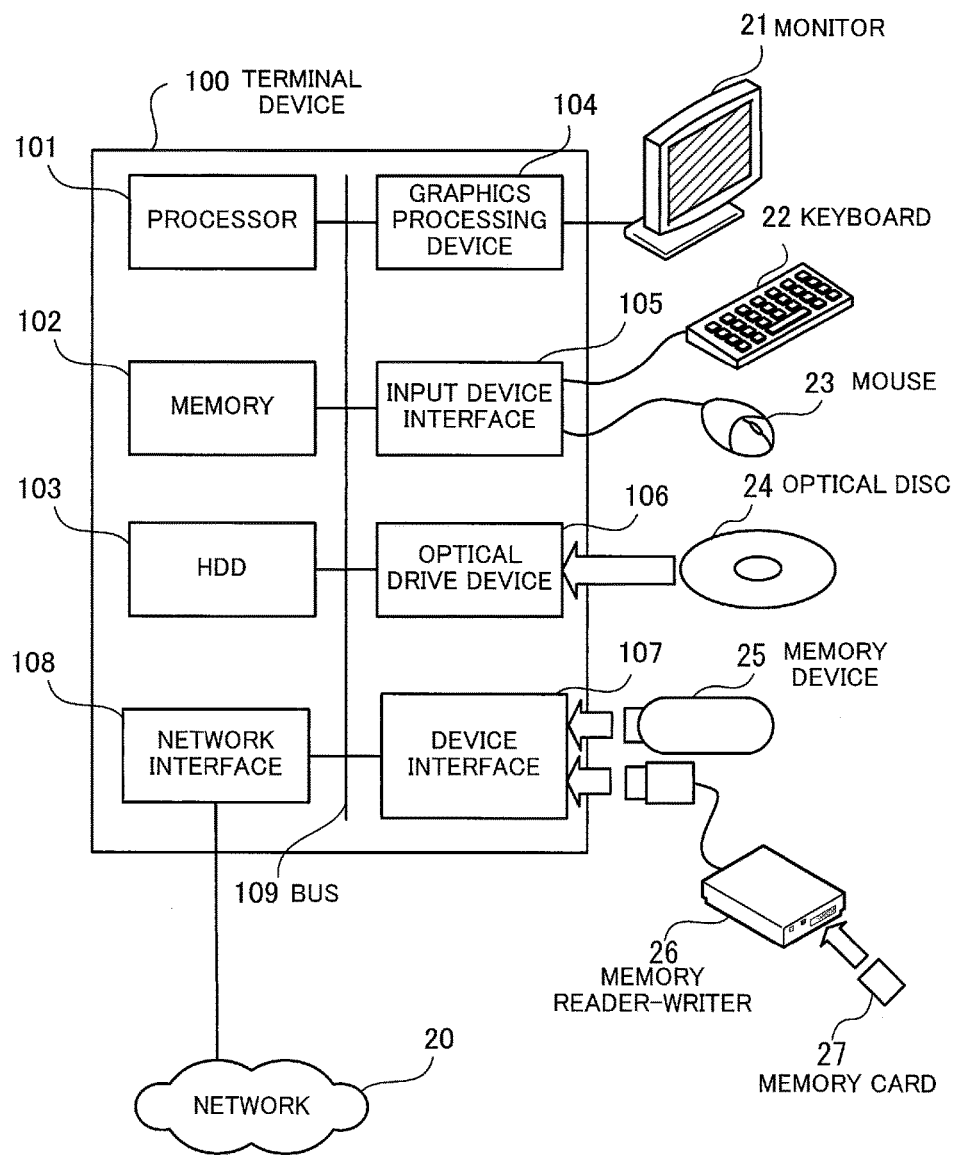
FIG. 3 illustrates an example of a hardware configuration of a terminal device.

FIG. 3 illustrates an example of a hardware configuration of a terminal device. The terminal device 100 is entirely controlled by a processor 101. To the processor 101, a memory 102 and a plurality of peripheral devices are connected via a bus 109. The processor 101 may be a multiprocessor. For example, the processor 101 may be a Central Processing Unit (CPU), Micro Processing Unit (MPU), or Digital Signal processor (DSP). At least part of functions implemented by the processor 101 executing programs may be implemented by using an Application Specific Integrated Circuit (ASIC), Programmable Logic Device (PLD), or other electronic circuits.

The memory 102 may be used as a primary storage device of the terminal device 100. The memory 102 temporarily stores at least part of OS and application programs to be executed by the processor 101. The memory 102 also stores various data to be used while the processor 101 operates. As the memory 102, a volatile semiconductor storage device, such as a Random Access Memory (RAM), may be used, for example.

The peripheral devices connected to the bus 109 include a Hard Disk Drive (HDD) 103, a graphics processing device 104, an input device interface 105, an optical drive device 106, a device interface 107, and a network interface 108.

The HDD 103 magnetically writes and reads data on a built-in disk. The HDD 103 is used as an auxiliary storage device of the terminal device 100. The HDD 103 stores the OS and application programs, and various data. In this connection, as the auxiliary storage device, a non-volatile storage device (Solid State Drive (SSD)), such as a flash memory, may be used.

A monitor 21 is connected to the graphics processing device 104. The graphics processing device 104 displays images on the screen of the monitor 21 in accordance with instructions from the processor 101. As the monitor 21, a Cathode Ray Tube (CRT) display device, a liquid crystal display device, or others may be used.

A keyboard 22 and a mouse 23 are connected to the input device interface 105. The input device interface 105 gives signals received from the keyboard 22 and mouse 23 to the processor 101. In this connection, the mouse 23 is an example of a pointing device, and other pointing devices may be used. Other pointing devices include a touch panel, tablet, touchpad, and trackball.

The optical drive device 106 reads data from an optical disc 24 with laser light or the like. The optical disc 24 is a portable recording medium on which data is recorded such as to be readable with reflection of light. As the optical disc 24, a Digital Versatile Disc (DVD), DVD-RAM, Compact Disc Read Only Memory (CD-ROM), CD-Recordable (CD-R), CD-Rewritable (CD-RW), or others may be used.

The device interface 107 is a communication interface that allows peripheral devices to be connected to the terminal device 100. For example, a memory device 25 and a memory reader-writer 26 are connected to the device interface 107. The memory device 25 is a recording medium that has a function of communication with the device interface 107. The memory reader-writer 26 performs data read and write on a memory card 27, which is a card-type recording medium.

The network interface 108 is connected to the network 20. The network interface 108 exchanges data with another computer or communication device over the network 20.

With the above hardware configuration, the processing functions of the second embodiment may be implemented. In this connection, the other terminal devices 100-1, 100-2, . . . and management server 200 may be implemented with the same hardware configuration as the terminal device 100 illustrated in FIG. 3. In addition, the information processing apparatus 10 of the first embodiment may also be implemented with the same hardware configuration as the terminal device 100 of FIG. 3.

The terminal device 100 implements the processing functions of the second embodiment by executing programs recorded on a computer-readable recording medium, for example. The programs describing the processing content to be executed by the terminal device 100 may be recorded in a variety of recording media. For example, such programs may be stored on the HDD 103, for example. The processor 101 loads at least part of the programs from the HDD 103 to the memory 102, and executes it. Alternatively, the programs to be executed by the terminal device 100 may be recorded on a portable recording medium, such as the optical disc 24, the memory device 25, or the memory card 27. The programs stored in such a portable recording medium become executable after being installed on the HDD 103 under the control of the processor 101, for example. Alternatively, the processor 101 may execute the programs directly read from the portable recording medium.

Figure 4:
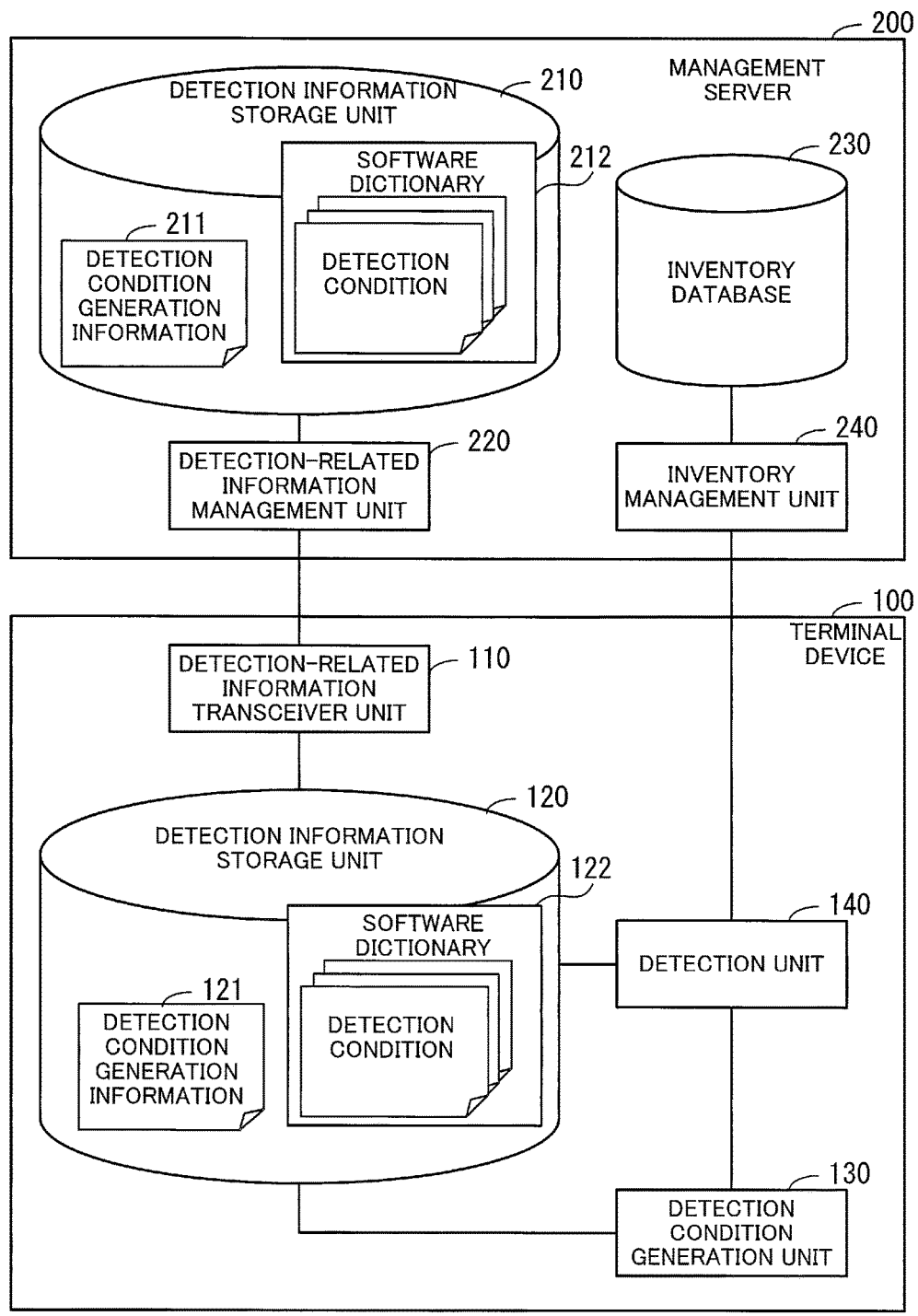
FIG. 4 is a block diagram illustrating an example of functions of each device.

FIG. 4 is a block diagram illustrating an example of functions of each device. The management server 200 includes a detection information storage unit 210, a detection-related information management unit 220, an inventory database 230, and an inventory management unit 240.

The detection information storage unit 210 stores information to be used for software detection. For example, the detection information storage unit 210 stores detection condition generation information 211 and a software dictionary 212. The detection condition generation information 211 relates to rules for generating detection conditions. The software dictionary 212 contains a collection of detection conditions to be used for detecting software. Each detection condition is a combination of information to be used for software detection. If each piece of information specified by a detection condition satisfies conditions indicated by the detection condition, this means that software is present. The detection information storage unit 210 is implemented as partial space of a memory or HDD provided in the management server 200, for example.

The detection-related information management unit 220 manages the detection condition generation information 211 and the software dictionary 212. For example, the detection-related information management unit 220 sends the detection condition generation information 211 and the software dictionary 212 to the terminal device 100. In addition, the detection-related information management unit 220 obtains updated detection conditions from the plurality of terminal devices 100, 100-1, 100-2, . . . , and stores them in the detection information storage unit 210.

The inventory database 230 stores inventory data on software resources introduced in the individual terminal devices 100, 100-1, 100-2, . . . .

The inventory management unit 240 obtains information about software installed on the individual terminal devices 100, 100-1, 100-2, . . . therefrom, and stores the obtained information in the inventory database 230.

The terminal device 100 includes a detection-related information transceiver unit 110, a detection information storage unit 120, a detection condition generation unit 130, and a detection unit 140.

The detection-related information transceiver unit 110 receives the detection condition generation information 211 and software dictionary 212 from the management server 200, and stores them in the detection information storage unit 120. The detection-related information transceiver unit 110 also reads detection conditions generated by the detection condition generation unit 130 from the detection information storage unit 120, and sends the detection conditions to the management server 200.

The detection information storage unit 120 stores detection condition generation information 121 and a software dictionary 122.

The detection condition generation unit 130 generates detection conditions on the basis of the detection condition generation information 121, and stores the generated detection conditions in the detection information storage unit 120.

The detection unit 140 detects software installed on the terminal device 100 utilizing the detection conditions stored in the detection information storage unit 120, and sends a software detection result to the management server 200.

With the above configuration, the terminal device 100 detects software, and the management server 200 collects inventory data. FIG. 4 illustrates the functions of the terminal device 100, and the other terminal devices 100-1, 100-2, . . . have the same functions as the terminal device 100. In addition, lines connecting the units illustrated in FIG. 4 represent some of communication paths, and other communication paths than the illustrated ones may be configurable. Further, the functions of each unit illustrated in FIG. 4 may be implemented by causing a computer to execute a program module corresponding to the unit.

The following describes information stored in the detection information storage units 120 and 210.

Figure 5:
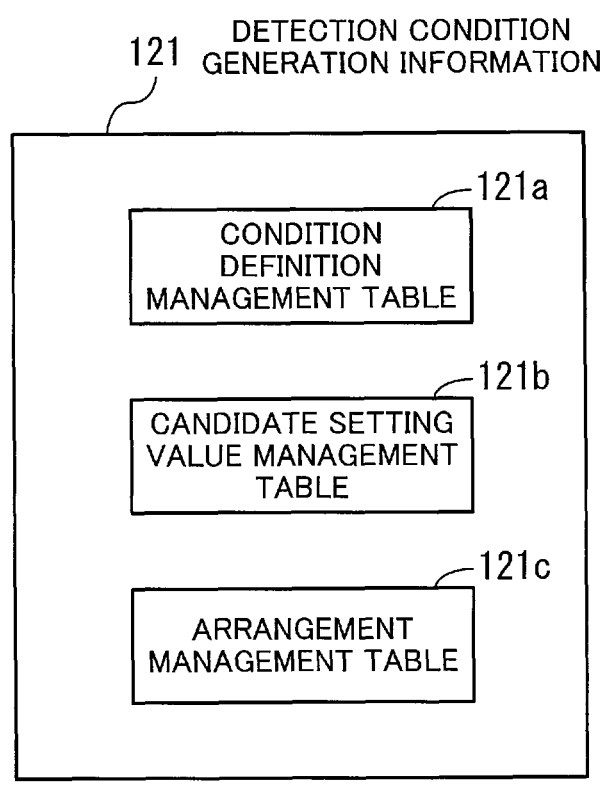
FIG. 5 illustrates an example of detection condition generation information.

FIG. 5 illustrates an example of detection condition generation information. The detection condition generation information 121 includes a condition definition management table 121a, a candidate setting value management table 121b, and an arrangement management table 121c.

The condition definition management table 121a indicates elements constituting conditions that are usable in detection conditions, and the categories of values to be set for the elements. The candidate setting value management table 121b manages candidate setting values for the elements specified in the condition definitions. The arrangement management table 121c manages condition definitions constituting individual detection conditions.

FIG. 6 illustrates an example of a condition definition management table. The condition definition management table 121a contains a plurality of condition definitions. The condition definition management table 121a includes the following fields: "Definition ID", "Detection Requirement", "Environment", "When", "From Where", "How", "Analysis Method", "Use information", and "How to Obtain Use Information". Out of these fields, the "Detection Requirement", "Environment", "When", "From Where", "How", "Analysis Method", "Use information", and "How to Obtain Use Information" fields are elements whose values are variable, and appropriate values are set when a detection condition is generated. In addition, the "When", "From Where", "How", "Analysis Method", "Use information", and "How to Obtain Use Information" fields are elements (information acquisition elements) that specify how to obtain information sought by a detection requirement.

The "Definition ID" field contains the identifier (definition ID) of a condition definition.

The "Detection Requirement" field specifies a requirement for detecting software. For example, assume that a condition definition includes "name" as a detection requirement. If a specific software name is obtained based on the values set for the information acquisition elements, this means that a condition generated according to this condition definition is satisfied. Detection requirements include the name, display version, bundle version, vendor name, license identification information, such as a product ID, of software to be detected.

The "Environment" field specifies in which system environment the corresponding condition definition is applicable. In this "Environment" field, OS type, device configuration, installation destination, environment variable, CPU architecture, or others may be specified, for example.

The "When" field specifies when to obtain information sought by a detection requirement. For example, this "When" field may specify that such information is to be obtained at the time of inventory collection.

The "From Where" field specifies from where to obtain information sought by a detection requirement. Information sought by a detection requirement may be obtained from a file, registry, process, network, service, event, message, or another. In the case where a condition definition includes "registry" in the "From Where" field, a condition generated according to this condition definition specifies where in the registry to obtain such information from.

The "How" field specifies how to obtain information sought by a detection requirement (acquisition method). Acquisition methods include file access, registry access, API call, command execution, communication, and others. In the case where a condition definition includes "API" in the "How" field, for example, a condition generated according to this condition definition specifies the use of the API to obtain such information.

The "Analysis Method" field specifies what part of information obtained as sought by a detection requirement is to be analyzed and how to analyze the partial information (analysis method). Analysis methods include access position, return value determination and analysis, and others. For example, in the case where a condition definition includes "API return value (character string)" in the "Analysis Method" field, a condition generated according to this condition definition specifies, as an analysis method, how to analyze a character string obtained as an API return value.

The "Use Information" field specifies use information to be used for obtaining information sought by a detection requirement. Use information includes a path, process name, command argument, user ID, package name, and others, for example.

The "How to Obtain Use Information" field specifies how to obtain use information. For example, in the case where use information is a user ID, this "How to Obtain Use Information" field may specify that a user ID is to be obtained from a logon user name. In the "How to Obtain Use Information" field, an environment for obtaining use information, when to obtain it, from where to obtain it, and how to obtain it may be specified.

FIG. 7 illustrates an example of a candidate setting value management table. The candidate setting value management table 121b lists candidate values that are settable for the following elements: "From Where", "How", "Analysis Method", "Use Information", and "How to Obtain Use Information" in the condition definitions of FIG. 6. The candidate setting value management table 121b includes the following fields: "Value ID", "Definition ID", "Category", and "Value".

The "Value ID" field contains the identification number (value ID) of a value. The "Definition ID" field contains the definition ID of a condition definition to which a value is applicable. The "Category" field specifies the category of an element (one of "from where", "how", "analysis method", "use information", and "how to obtain use information") for which a value is set. The "Value" field contains a specific value that is settable for the element specified by the "Category" field.

FIG. 8 illustrates an example of an arrangement management table. An arrangement management table 121c contains combinations of condition definitions forming generation information for detection conditions. The arrangement management table 121c has the following fields: "Arrangement ID" and "Definition ID," for example. The "Arrangement ID" field contains the identification information (arrangement ID) of generation information formed of a combination of condition definitions. The "Definition ID" field contains the definition ID of a condition definition forming generation information. A set of definitions IDs corresponding to the same arrangement ID represents a combination of condition definitions forming detection condition generation information. Each combination of condition definitions is treated as a generating rule for a detection condition.

Referring to the example of FIG. 8, a plurality of definition IDs are registered in association with an arrangement ID "C0001". In this case, if all conditions respectively generated according to the condition definitions identified by the definition IDs corresponding to the arrangement ID "C0001" are satisfied, this means that the corresponding software is present. In this connection, the combination of condition definitions corresponding to the arrangement ID "C0001" is used for generating a detection condition for detecting a desktop application whose OS name is "OS_A".

The example of the detection condition generation information 121 stored in the terminal device 100 has been described with reference to FIGS. 5 to 8. The detection condition generation information 211 stored in the management server 200 have the same content as the detection condition generation information 121.

The software dictionary 122 will now be described.

Figure 9:
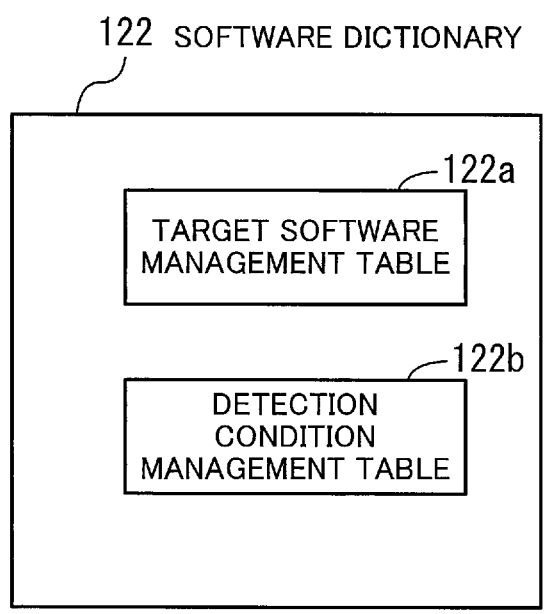
FIG. 9 illustrates an example of a software dictionary.

FIG. 9 illustrates an example of a software dictionary. The software dictionary 122 includes a target software management table 122a and a detection condition management table 122b, for example. The target software management table 122a indicates software to be detected using detection conditions. The detection condition management table 122b contains detection conditions.

FIG. 10 illustrates an example of a target software management table. The target software management table 122a includes the following fields: "Condition ID", "Name", and "Version". The "Condition ID" field contains the identifier (condition ID) of a detection condition. The "Name" field contains the name of software to be detected by a detection condition identified by a corresponding condition ID. The "Version" field contains the version number of software to be detected.

FIG. 11 illustrates an example of a detection condition management table. Each entry registered in the detection condition management table 122b indicates an information acquisition condition to be used in a detection condition. The detection condition management table 122b includes the following fields: "Condition ID", "Arrangement ID", "Definition ID", "From Where", "How", "Analysis Method", "Use Information", and "How to Obtain Use Information".

The "Condition ID" field contains the condition ID of a detection condition. A combination of information acquisition conditions corresponding to the same condition ID is treated as a single detection condition. The "Arrangement ID" field contains an arrangement ID indicating a combination of condition definitions forming a detection condition. The "Definition ID" field contains the definition ID of a condition definition from which a corresponding information acquisition condition forming the detection condition is generated. The "From Where" field contains a specific value specifying from where to obtain information sought by a detection requirement. The "How" field contains a specific value specifying how to obtain information sought by a detection requirement. The "Analysis Method" field contains a specific value specifying how to analyze information sought by a detection requirement. The "Use Information" field contains a specific value specifying use information to be used for obtaining information sought by a detection requirement. The "How to Obtain Use Information" field contains a specific value specifying how to obtain use information.

The example of the software dictionary 122 stored in the terminal device 100 has been described with reference to FIGS. 9 to 11. The software dictionary 212 stored in the management server 200 have the same content as the software dictionary 122.

In the above-described system, the management server 200 distributes the detection condition generation information 211 and the software dictionary 212 to the terminal device 100. The terminal device 100 stores the detection condition generation information 121 and the software dictionary 122 having the same content as the received detection condition generation information 211 and software dictionary 212.

The detection condition generation unit 130 of the terminal device 100 generates detection conditions from the detection condition generation information 121. For example, the terminal device 100 extracts a combination of definition IDs that match the environment of the terminal device 100, from among the combinations of definition IDs indicated in the arrangement management table 121c of the detection condition generation information 121. Then, the terminal device 100 extracts candidate values corresponding to the information acquisition elements of each condition definition included in the extracted combination, from the candidate setting value management table 121b. Then, the terminal device 100 generates candidate detection conditions by applying the values extracted from the candidate setting value management table 121b to the information acquisition elements of the condition definitions. The terminal device 100 makes an attempt to detect software on the terminal device 100 utilizing each candidate detection condition, and takes a candidate detection condition that has led to the detection of the software, as a detection condition for detecting the software.

The terminal device 100 detects the presence of software utilizing a plurality of detection conditions generated from the detection condition generation information 121. In this software detection, software is judged to be installed if a corresponding detection condition is satisfied on the terminal device 100, and the software is judged not to be installed if the detection condition is not satisfied. The terminal device 100 executes the software detection periodically (for example, once daily).

The terminal device 100 may fail to detect specific software utilizing a first detection condition included in a plurality of detection conditions although the software was previously judged to be installed utilizing the first detection condition. In this case, the terminal device 100 detects the presence of the specific software utilizing another detection condition included in the plurality of detection conditions.

In the case where software is not detected by a generated detection condition under which the software was previously detected, the terminal device 100 detects a change in the environment or uninstallment through the following processes, which are performed in the following order. In this connection, changes in the environment include a change due to upgrading of software and a change due to upgrading of an operating platform (OS or the like) for executing software.

a) The terminal device 100 extracts values that are applicable as values for information acquisition elements in condition definitions corresponding to the current detection condition, from the candidate setting value management table 121b, and detects software using the extracted values.

b) If software is not detected through the process a), the terminal device 100 causes the detection condition generation unit 130 to generate another detection condition (changes a means for detection) and then detects the software utilizing the generated detection condition.

If the software is detected through either of the processes a) and b), the terminal device 100 determines that the environment has been changed. If the software is not detected through these processes a) and b), the terminal device 100 judges that the software is already uninstalled.

If the terminal device 100 detects specific software utilizing another detection condition, the terminal device 100 uses the other detection condition in the next software detection. In addition, if there has been no change in the environment of the software, the terminal device 100 uses the generated detection condition in the next software detection. This minimizes the cost (speed, load) for the generation and keeps a high processing performance. In addition, if the terminal device 100 fails to detect specific software utilizing any of the plurality of detection conditions, the terminal device 100 judges that the specific software is already uninstalled.

Meantime, the management server 200 obtains detection conditions dynamically generated by the terminal device 100 via the detection-related information management unit 220, and automatically adds the obtained detection conditions to the locally owned software dictionary 212. If a detection condition generated by the terminal device 100 has different values for information acquisition elements from a prior one, the management server 200 updates the corresponding detection condition.

The above-described system makes it possible to generate a detection condition for detecting software newly installed on the terminal device 100, for example. In addition, when the environment of the terminal device 100 is changed, the detection condition is modified according to the change. In the case where the environment is changed too much and this change is not followed by modifying the detection condition, then it is possible to generate another detection condition appropriate for the new environment.

Figure 12:
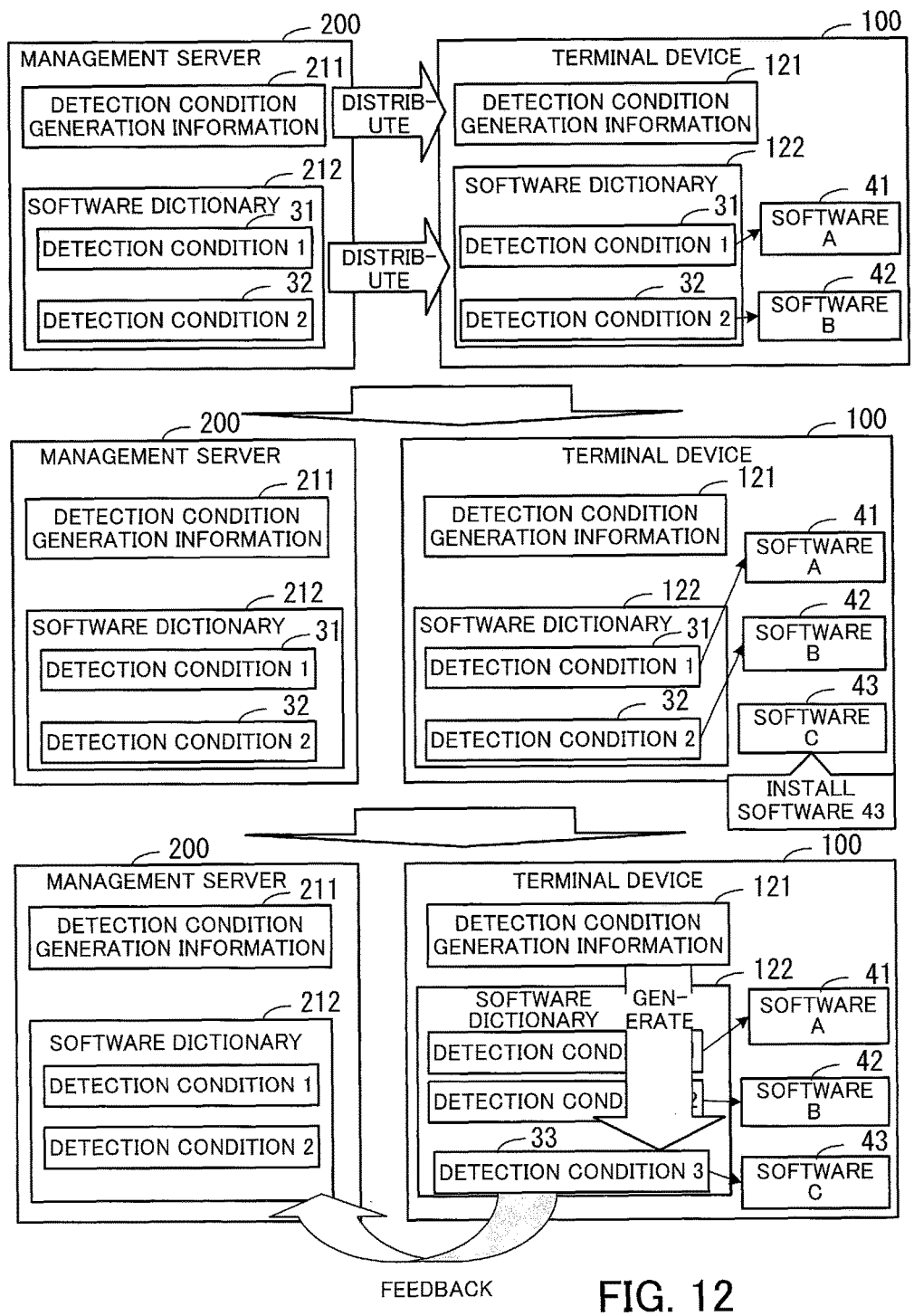
FIG. 12 illustrates an example of generating a detection condition for detecting newly installed software.

FIG. 12 illustrates an example of generating a detection condition for detecting newly installed software. The management server 200 distributes detection condition generation information 211 and software dictionary 212 to the terminal device 100. The terminal device 100 holds detection condition generation information 121 and software dictionary 122 that have the same content as the received detection condition generation information 211 and software dictionary 212. Then, the terminal device 100 periodically detects software utilizing the detection conditions 31 and 32 included in the software dictionary 122. Referring to the example of FIG. 12, software 41 named "software A" is detected by the detection condition 31 and software named "software B" is detected by the detection condition 32.

It is now assumed that software 43 named "software C" is additionally installed on the terminal device 100 after that. In this case, the terminal device 100 does not detect the software 43 utilizing the existing detection conditions 31 and 32. Then, the terminal device 100 makes an attempt to generate a candidate detection condition appropriate for the environment of the terminal device 100, according to the detection condition generation information 121, and then to detect the software 43. Referring to the example of FIG. 12, the software 43 is detected by a detection condition 33.

The detection condition 33 that has led to the detection of the software 43 is sent to the management server 200 and then is stored in the software dictionary 212 of the management server 200. Thereby, the terminal device 100 feeds a result of generating the detection condition back to the management server 200.

As described above, it is possible to automatically generate a detection condition that leads to the detection of the software 43, for which a detection condition is not stored in the software dictionary 212 of the management server 200. This makes it possible to reduce the time and cost that are needed from generation and update of a detection condition by a user or resource management vendor up to application thereof.

If software is not detected by detection conditions provided by the management server 200, a conventional system would need workload from an administrator because a new detection condition needs to be manually defined for the software to be detected. This means that the software is not detected until the administrator adds the new detection condition. By contrast, the second embodiment makes it possible to automatically generate a new detection condition and to detect software, which is not detected by existing detection conditions, utilizing the new detection condition. The automatic generation of detection conditions reduces the administrator's workload. In addition, the automatic generation of detection conditions is done at the time of inventory collection. Therefore, when the new software 43 is added, its corresponding detection condition 33 is generated immediately.

Figure 13:
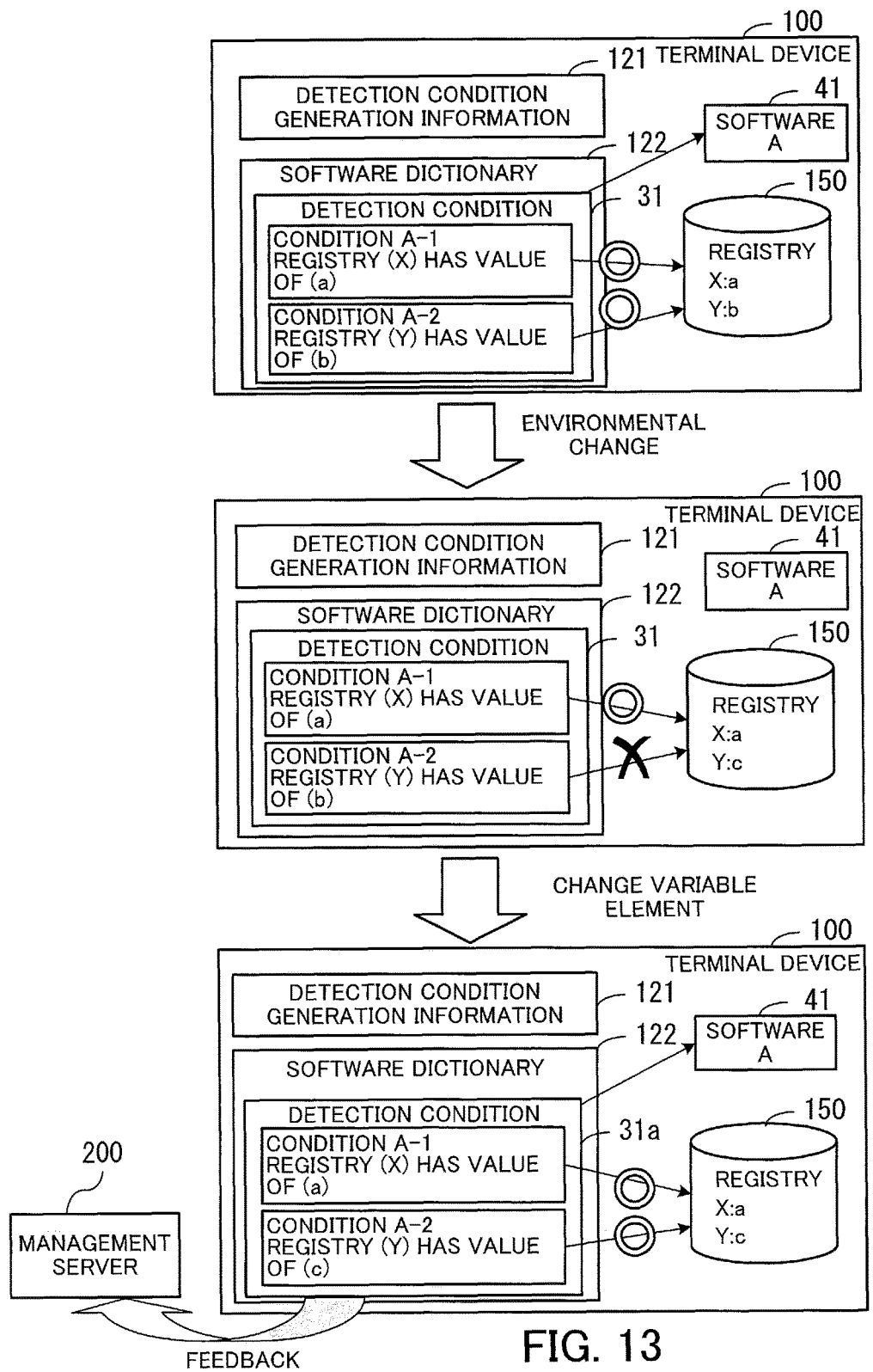
FIG. 13 illustrates an example of modifying a detection condition according to a change in environment.

FIG. 13 illustrates an example of modifying a detection condition according to a change in environment. Referring to the example of FIG. 13, the detection condition 31 for the software 41 includes a plurality of conditions using setting values that are set in the registry 150. The first condition is that an item "X" has a setting value of "a" in the registry 150. The second condition is that an item "Y" has a setting value of "b" in the registry 150. The software 41 is judged to be installed if these conditions are both satisfied.

It is now assumed that the software 41 is upgraded and setting values are changed in the registry 150 after the software 41 is detected by the detection condition 31 and before the next software detection. Referring to the example of FIG. 13, the setting value of the item "Y" is changed from "b" to "c". In this case, the second condition is not satisfied even if there is an attempt to detect the software 41 utilizing the detection condition 31. Thus, the software 41 is not detected.

When the terminal device 100 fails to detect the software 41, which was previously detected successfully, the terminal device 100 modifies the values of information acquisition elements included in the current detection condition 31, and makes an attempt to detect the software 41 again. In this case, the second condition is modified to indicate that the item "Y" has a setting value of "c", so that the second condition gets satisfied, and thus the software 41 is accurately judged to be installed.

The detection condition 31*a* that has led to the detection of the software 41 is sent to the management server 200 and is stored in the software dictionary 212 of the management server 200. That is, the terminal device 100 feeds a result of generating the detection condition back to the management server 200.

As described above, in the case where the software 41 is not detected because the detection condition 31 defined in the software dictionary 122 specifies values that are no longer appropriate due to a change in the environment of the terminal device 100, the values of the information acquisition elements are modified and thereby the software 41 is detected. As a result, it is possible to appropriately distinguish between a change in the environment due to software upgrading and uninstallment of the software, thereby improving the accuracy of detection of the software 41.

Figure 14:
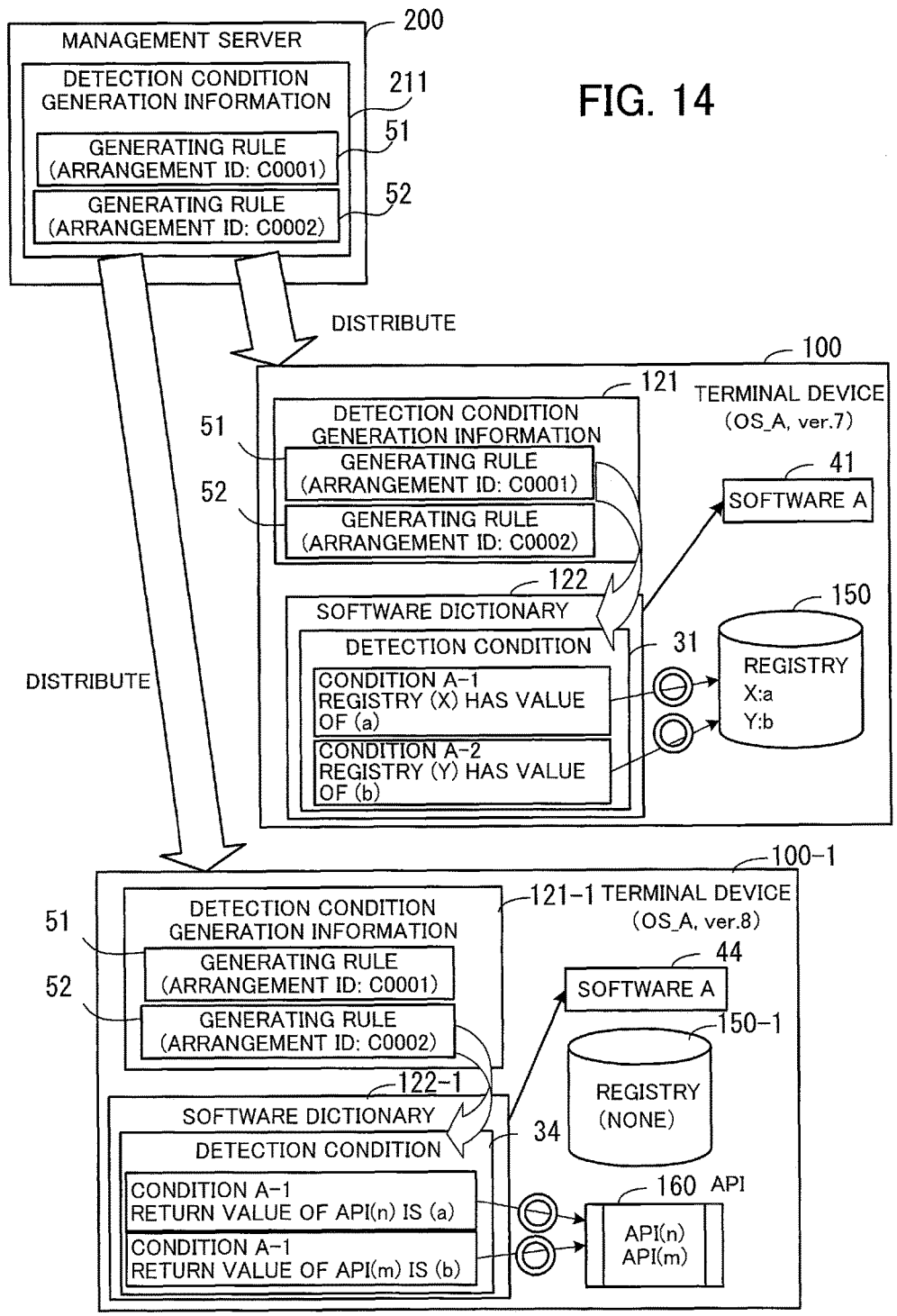
FIG. 14 illustrates an example of generating a detection condition appropriate for an environment.

FIG. 14 illustrates an example of generating a detection condition appropriate for an environment. Referring to the example of FIG. 14, a plurality of terminal devices 100 and 100-1 having different platforms are illustrated. These terminal devices 100 and 100-1 have different versions of the same OS. In the version of the OS installed on the terminal device 100, the setting values for the environment for the software 41 named "software A" are held in the registry 150. In the version of the OS installed on the terminal device 100-1, the setting values for the environment for the software 44 that is the same type as the software 41 are stored in a place different from a registry 150-1, and are read using an API 160.

In such a case, the management server 200 distributes the detection condition generation information 211 to the terminal devices 100 and 100-1. The detection condition generation information 211 includes a plurality of generating rules on detection conditions. For example, a generating rule 51 corresponding to the arrangement ID "C0001" and a generating rule 52 corresponding to the arrangement ID "C0002" are included in the detection condition generation information 211. The generating rule 51 corresponding to the arrangement ID "C0001" is applicable to systems with the version 7 of OS_A, whereas the generating rule 52 corresponding to the arrangement ID "C0002" is applicable to systems with the version 8 of OS_A (see FIG. 8).

The terminal device 100 is a system with the version 7 of OS_A. Therefore, a detection condition 31 is generated from the generating rule 51 corresponding to the arrangement ID "C0001" out of the generating rules 51 and 52 included in the stored detection condition generation information 121. The generated detection condition 31 is stored in the software dictionary 122. The detection condition 31 needs confirmation of setting values in the registry 150, for example. FIG. 14 illustrates an example in which the correct setting values exist in the registry 150, and therefore the software 41 is accurately judged to be installed.

The terminal device 100-1 is a system with the version 8 of OS_A. Therefore, a detection condition 34 is generated from the generating rule 52 corresponding to the arrangement ID "C0002" out of the generating rules 51 and 52 included in stored detection condition generation information 121-1. The generated detection condition 34 is stored in a software dictionary 122-1. The detection condition 34 needs confirmation of a return value from an API 160. FIG. 14 illustrates an example in which the correct return value is obtained from the API 160, and therefore the software 44 is accurately judged to be installed.

As described above, there are cases where new detection conditions need to be added to the software dictionary 122, 122-1 because a new platform is adopted (new OS or operating environment for application is added) or the specifications of OS or software are changed. In such cases, a conventional system needs to change both detection conditions and a detection process. By contrast, the second embodiment makes it possible to automatically generate detection conditions from detection condition generation information. As a result, software is accurately detected even if the operating environment for the software is greatly changed.

The following describes how to detect software in detail.

Figure 15:
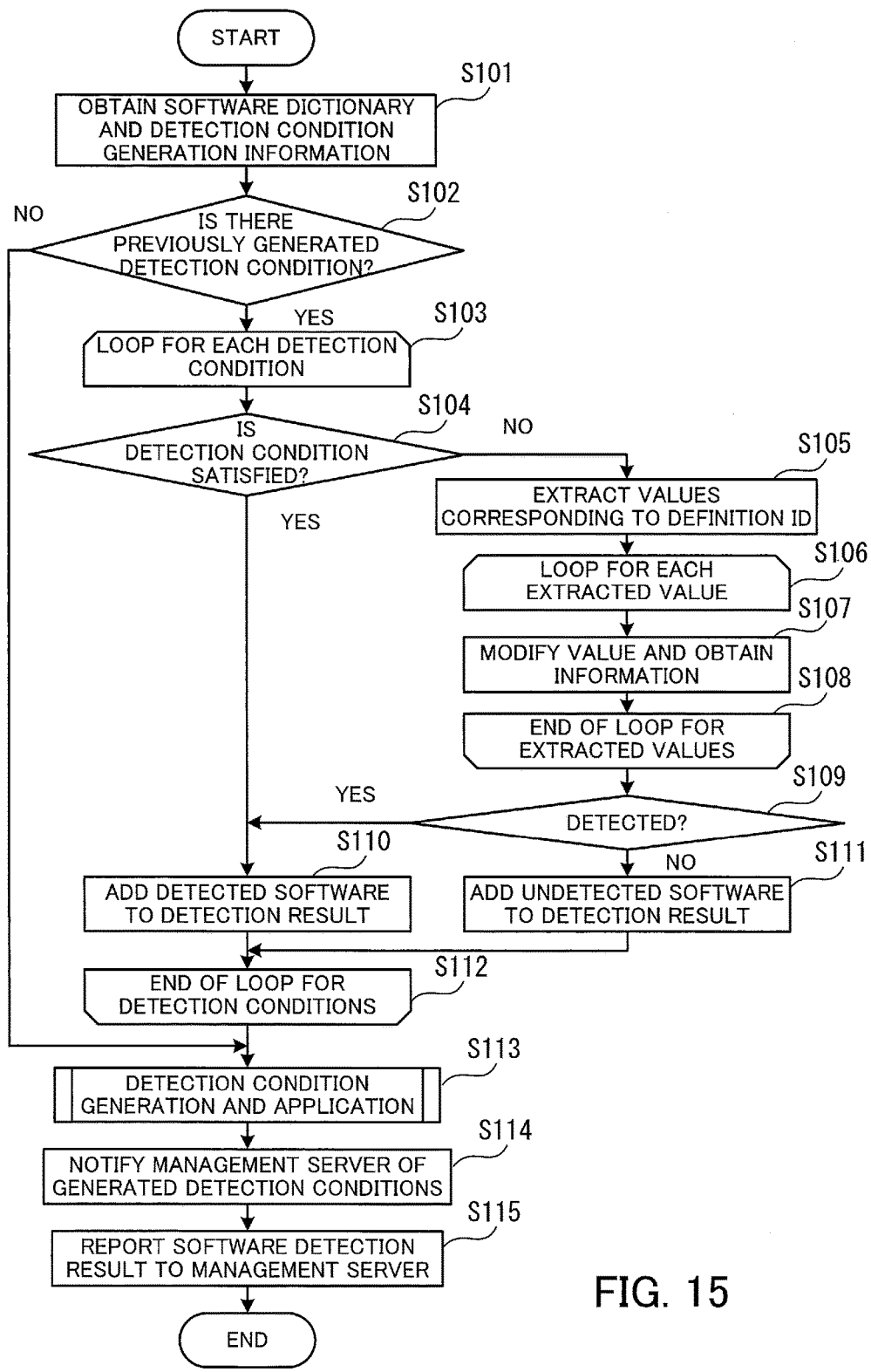
FIG. 15 illustrates an example of a software detection process.

FIG. 15 illustrates an example of a software detection process.

(Step S101) The detection-related information transceiver unit 110 obtains a software dictionary and detection condition generation information from the management server 200. The detection-related information transceiver unit 110 stores a software dictionary and detection condition generation information that have the same content as the obtained ones, in the detection information storage unit 120.

(Step S102) The detection unit 140 determines whether the software dictionary 122 stores a previously generated detection condition. For example, if at least one software is registered in association with a condition ID in the target software management table 122*a*, the detection unit 140 determines that a previously generated detection condition exists. In this case, the process proceeds to step S103. If there is no previously generated detection condition, then the process proceeds to step S113.

(Step S103) The detection unit 140 executes steps S104 to S111 with respect to each of the detection conditions corresponding to the condition IDs registered in the target software management table 122*a*.

(Step S104) The detection unit 140 determines whether a detection condition of attention is satisfied or not. For example, the detection unit 140 extracts information acquisition conditions corresponding to the condition ID of the detection condition of attention, from the detection condition management table 122*b*. Then, the detection unit 140 makes an attempt to obtain information on the basis of each of the extracted information acquisition conditions. When appropriate information is obtained based on all of the extracted information acquisition conditions, the detection unit 140 determines that the detection condition of attention is satisfied. When the detection condition is satisfied, the process proceeds to step S110. If the detection condition is not satisfied, the process proceeds to step S105.

(Step S105) The detection unit 140 specifies the definition ID of an information acquisition condition based on which no information was obtained at step S104, and extracts values corresponding to the definition ID from the candidate setting value management table 121*b*.

(Step S106) The detection unit 140 repeats step S107 for each of the extracted values.

(Step S107) The detection unit 140 modifies the value corresponding to the category of an extracted value to the extracted value, in the information acquisition condition, and makes an attempt to obtain information utilizing the new information acquisition condition.

(Step S108) When the detection unit 140 completes step S107 for all the extracted values, the process proceeds to step S109.

(Step S109) The detection unit 140 judges whether software has been detected by the detection condition of attention. If software has been detected, the process proceeds to step S110. If software has not been detected, the process proceeds to step S111. In this connection, when the software has been detected successfully, the detection unit 140 updates the values of the information acquisition condition to the values used for the successful detection of the software, in the detection condition management table 122*b*.

(Step S110) The detection unit 140 adds the software detected by the detection condition of attention to a detection result as detected software. For example, the detection unit 140 records the name and version of the software, which are registered in association with the condition ID of the detection condition of attention in the target software management table 122*a*, with a detection flag attached thereto in the detection result. Then, the process proceeds to step S112.

(Step S111) The detection unit 140 adds the software previously detected by the detection condition of attention to the detection result as undetected software. For example, the detection unit 140 records the name and version of the software, which are registered in association with the condition ID of the detection condition of attention in the target software management table 122*a*, with an undetection flag attached thereto in the detection result.

(Step S112) When the detection unit 140 has used all the detection conditions, the process proceeds to step S113.

(Step S113) The detection condition generation unit 130 performs a detection condition generation and application process. This process will be described in detail later (refer to FIG. 16).

(Step S114) The detection-related information transceiver unit 110 notifies the management server 200 of generated detection conditions. For example, the detection-related information transceiver unit 110 extracts detection conditions generated by the detection condition generation unit 130 from the software dictionary 122 and sends the detection conditions to the management server 200. In addition, if there is a detection condition whose information acquisition condition includes a value updated at step S109, the detection-related information transceiver unit 110 sends the detection condition to the management server 200. In the management server 200, the detection-related information management unit 220 receives and stores the detection conditions in the software dictionary 212.

(Step S115) The detection unit 140 reports the detection result to the management server 200. For example, the detection unit 140 sends a list of detected software and a list of undetected software to the management server 200.

The following describes the detection condition generation and application process in detail.

Figure 16:
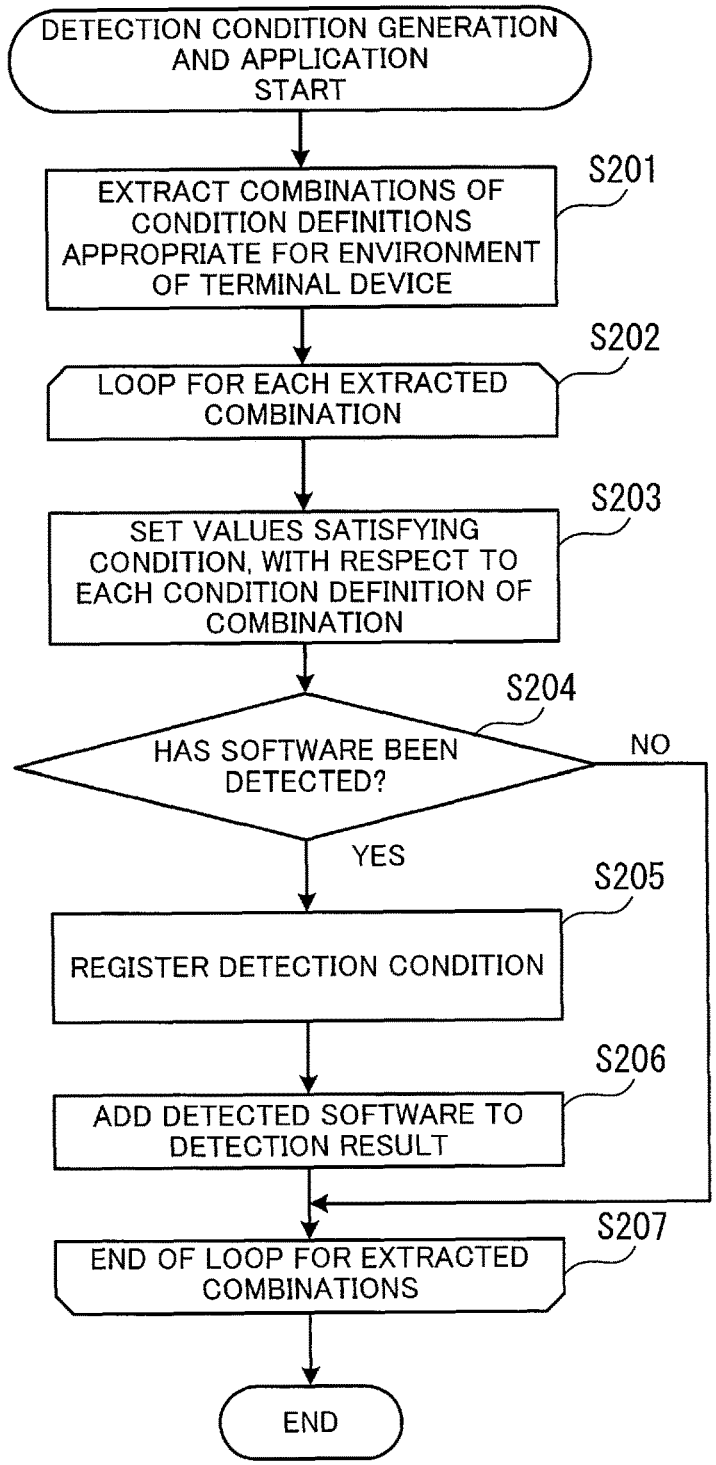
FIG. 16 is a flowchart illustrating a detection condition generation and application process.

FIG. 16 is a flowchart illustrating a detection condition generation and application process.

(Step S201) The software condition generation unit 130 extracts combinations of condition definitions (generating rules) appropriate for the environment of the terminal device 100 from the detection condition generation information 121. For example, the detection condition generation unit 130 specifies the definition IDs corresponding to an arrangement ID that matches the environment of the terminal device 100, from the arrangement management table 121*c*. Then, the detection condition generation unit 130 extracts the condition definitions corresponding to the specified definition IDs from the condition definition management table 121*a*.

(Step S202) The detection condition generation unit 130 repeats steps S203 to S206 for each combination extracted at step S201. Using only combinations of condition definitions appropriate for the environment eliminates the need of generating detection conditions that are not applicable to the terminal device 100, thereby streamlining the processing.

(Step S203) The detection condition generation unit 130 sets candidate setting values for information acquisition elements with respect to each condition definition included in a combination of attention, and then makes an attempt to obtain information. The candidate setting values are obtained from the candidate setting value management table 121*b*. In the case where there are a plurality of candidate setting values for one information acquisition element, the detection condition generation unit 130 makes an attempt to obtain information using each of the candidates. Then, the detection condition generation unit 130 specifies values satisfying the condition with respect to each condition definition. In the case where values satisfying the conditions are specified with respect to all condition definitions of the combination of attention, this means that software has been detected.

(Step S204) The detection condition generation unit 130 judges whether software has been detected. If software has been detected, the process proceeds to step S205. If software has not been detected, the process proceeds to step S207.

(Step S205) The detection condition generation unit 130 registers the detection condition based on the setting values of the condition definitions that have led to the detection of the software, in the software dictionary 122. For example, the detection condition generation unit 130 generates and registers a new condition ID in the target software management table 122*a*. Then, the detection condition generation unit 130 registers the name and version of the software detected at step S203 in association with the registered condition ID in the target software management table 122*a*. Further, the detection condition generation unit 130 registers the arrangement ID of the combination of condition definitions that have led to the detection of the software and the definition IDs of the condition definitions in association with the generated condition ID in the detection condition management table 122*b*. Then, the detection condition generation unit 130 registers the setting values used for the information acquisition elements in the condition definitions corresponding to the definition IDs for the detection of the software, in association with the registered definition IDs in the detection condition management table 122*b*.

(Step S206) The detection unit 140 receives a notification of the detection of the software utilizing the new detection condition from the detection condition generation unit 130, and adds the software as detected software to a detection result. In this connection, if the detected software appears in the list of undetected software, the detection unit 140 deletes the detected software from the list.

(Step S207) When the detection condition generation unit 130 has used all the combinations extracted at step S201, this detection condition generation and application process is completed.

As described above, even if software is not detected by the same detection condition as used previously due to a change in environment, it is possible to detect the software utilizing another detection condition. This approach makes it possible to improve the accuracy of software detection and to send an accurate detection result to the management server 200.

In addition, it is possible to detect software, without the need for a resource management product vendor or an administrator of a user system to generate detection conditions for individual software. This reduces administrators' workload.

Still further, it is possible to automatically update the software dictionary 212 in the management server 200. This enables the management server 200 to distribute the latest software dictionary to the terminal devices 100, 100-1, 100-2, . . . , thereby improving the accuracy of software detection.

In this connection, detection conditions generated by the terminal devices 100, 100-1, 100-2, . . . are held in the terminal devices 100, 100-1, 100-2, . . . and are used repeatedly. This makes it possible to detect software without degrading the performance of the terminal devices 100, 100-1, 100-2, . . . , except for the first detection and the case where the environment is changed.

In the second embodiment, inventory data is collected from the terminal devices 100, 100-1, 100-2, . . . . Alternatively, inventory data may be collected from servers and other computers. In this case, computers from which inventory data is collected are provided with the same function as the terminal device 100 of FIG. 4. In addition, the terminal devices 100, 100-1, 100-2, . . . may include portable information terminals and tablet terminals. Alternatively, the terminal devices 100, 100-1, 100-2, . . . may be virtual machines.

Heretofore, the embodiments have been exemplified. In this connection, the components described in the embodiments may be replaced with other components having equivalent functions or other components or processing operations may be added. In addition, desired two or more configurations (features) in the embodiments may be combined.

According to one aspect, it is possible to improve the accuracy of software detection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a software detection program that causes a processor of a computer to execute a process comprising:
   first detecting a presence of a specific software on the computer utilizing a first detection condition, the specific software being judged to be installed on the computer by prior detection utilizing the first detection condition, the first detection condition being generated by one of a plurality of detection condition generating rules stored in a memory for the specific software, wherein the first detecting includes making an attempt to obtain specific information based on a first information acquisition condition indicated in the first detection condition and determining that the specific software is detected when the specific information is obtained;
   generating a second detection condition according to one of the plurality of detection condition generating rules when the specific software is not detected by the first detection condition, the second detection condition indicating a second information acquisition condition different from the first information acquisition condition indicated in the first detection condition;
   second detecting the specific software utilizing the second detection condition, wherein the second detecting includes making an attempt to obtain the specific information based on the second information acquisition condition indicated in the second detection condition and determining that the specific software is detected when the specific information is obtained; and
   outputting a result of the first and second detecting.

2. The non-transitory computer-readable storage medium according to claim 1, wherein the process further includes judging that the specific software is already uninstalled from the computer when the specific software is not detected by any of second detection conditions among the plurality of detection conditions.

3. The non-transitory computer-readable storage medium according to claim 1, wherein the detecting utilizing the second detection condition includes generating the second detection condition by modifying values included in the first detection condition to other values that are preset candidate setting values.

4. The non-transitory computer-readable storage medium according to claim 1, wherein:
   the plurality of detection condition generating rules are associated with corresponding operating environments for the software; and
   the detecting utilizing the second detection condition includes detecting the specific software utilizing the second detection condition generated by a detection condition generating rule corresponding to an operating environment of the computer at a detection time.

5. A software detection method comprising:
   first detecting, by a processor of a computer, a presence of a specific software on the computer utilizing a first detection condition, the specific software being judged to be installed on the computer by prior detection utilizing the first detection condition, the first detection condition being generated by one of a plurality of detection condition generating rules stored in a memory for the specific software, wherein the first detecting includes making an attempt to obtain specific information based on a first information acquisition condition indicated in the first detection condition and determining that the specific software is detected when the specific information is obtained;
   generating, by the processor, a second detection condition according to one of the plurality of detection condition generating rules when the specific software is not detected by the first detection condition, the second detection condition indicating a second information acquisition condition different from the first information acquisition condition indicated in the first detection condition;
   second detecting, by the processor, the specific software utilizing the second detection condition, wherein the second detecting includes making an attempt to obtain the specific information based on the second information acquisition condition indicated in the second detection condition and determining that the specific software is detected when the specific information is obtained; and outputting a result of the first and second detecting.

6. A software detection apparatus for detecting software, the apparatus comprising:
a memory that stores a plurality of detection condition generating rules for the software; and
a processor that executes a process including:
first detecting a presence of a specific software on the software detection apparatus utilizing a first detection condition, the specific software being judged to be installed on the software detection apparatus by prior detection utilizing the first detection condition, the first detection condition being generated by one of the plurality of detection condition generating rules stored in a memory for the specific software, wherein the first detecting includes making an attempt to obtain specific information based on a first information acquisition condition indicated in the first detection condition and determining that the specific software is detected when the specific information is obtained;
generating a second detection condition according to one of the plurality of detection condition generating rules when the specific software is not detected by the first detection condition, the second detection condition indicating a second information acquisition condition different from the first information acquisition condition indicated in the first detection condition;
second detecting the specific software utilizing the second detection condition, wherein the second detecting includes making an attempt to obtain the specific information based on the second information acquisition condition indicated in the second detection condition and determining that the specific software is detected when the specific information is obtained; and
outputting a result of the first and second detecting.

* * * * *